(12) United States Patent
Mraz et al.

(10) Patent No.: US 8,352,450 B1
(45) Date of Patent: Jan. 8, 2013

(54) DATABASE UPDATE THROUGH A ONE-WAY DATA LINK

(75) Inventors: Ronald Mraz, South Salem, NY (US); James Hope, Greenwich, CT (US); Andrew Holmes, Darien, CT (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 97 days.

(21) Appl. No.: 11/788,077

(22) Filed: Apr. 19, 2007

(51) Int. Cl.
*G06F 7/00* (2006.01)

(52) U.S. Cl. .......... 707/705; 707/791; 709/200; 713/201

(58) Field of Classification Search .................. None
See application file for complete search history.

(56) References Cited

U.S. PATENT DOCUMENTS

| | | | |
|---|---|---|---|
| 4,672,601 A | 6/1987 | Ablay | 370/277 |
| 5,282,200 A | 1/1994 | Dempsey et al. | 370/245 |
| 5,703,562 A | 12/1997 | Nilsen | |
| 5,769,527 A | 6/1998 | Taylor et al. | 362/85 |
| 5,983,332 A | 11/1999 | Watkins | 711/202 |
| 6,108,787 A | 8/2000 | Anderson et al. | |
| 6,178,427 B1 | 1/2001 | Parker | |
| 6,262,993 B1 | 7/2001 | Kirmse | 370/463 |
| 6,415,329 B1 | 7/2002 | Gelman et al. | |
| 6,529,917 B1 | 3/2003 | Zoltan | |
| 6,546,422 B1 | 4/2003 | Isoyama et al. | 709/225 |
| 6,578,022 B1 | 6/2003 | Foulger et al. | |
| 6,609,183 B2 | 8/2003 | Ohran | |
| 6,665,268 B1 | 12/2003 | Sato et al. | 370/242 |
| 6,728,213 B1 | 4/2004 | Tzeng et al. | 370/235 |

(Continued)

FOREIGN PATENT DOCUMENTS

WO    WO 2004/105297 A2    12/2005

OTHER PUBLICATIONS

M. Anderson, C. North, J. Griffin, R. Milner, J. Yesberg, K. Yiu, "Starlight: Interactive Link," 1996, Defence Science & Technology Organisation, Salisbury, South Australia, Australia.

(Continued)

*Primary Examiner* — Apu Mofiz
*Assistant Examiner* — Thu Nga Nguyen
(74) *Attorney, Agent, or Firm* — Amster, Rothstein & Ebenstein LLP

(57) ABSTRACT

A database updating application for updating through a one-way data link a remote database in accordance with a change in a reference database is disclosed, which comprises a database trigger client associated with the reference database for generating a database update message in the form of a file or a data packet corresponding to the change in the reference database and sending the database update message to a send node interconnected to a receive node by the one-way data link, and a database trigger server associated with the remote database for receiving the database update message transmitted across the one-way data link and replicating the change on the remote database in accordance with the database update message. The present invention provides database update through a one-way data link that may be implemented efficiently in real time and with a mechanism for verifying the integrity and operability of the one-way data link for the purpose of database update. In addition, the present invention provides a way to combine the functionalities of the conventional database update applications with the security afforded by the use of a one-way data link.

43 Claims, 4 Drawing Sheets

U.S. PATENT DOCUMENTS

| | | | |
|---|---|---|---|
| 6,745,209 | B2 | 6/2004 | Holenstein et al. |
| 6,792,432 | B1* | 9/2004 | Kodavalla et al. ........ 707/103 R |
| 6,807,166 | B1 | 10/2004 | Ohura ............................ 370/352 |
| 6,988,148 | B1 | 1/2006 | Sheth ............................. 709/245 |
| 7,016,085 | B2 | 3/2006 | Gonzalez et al. .............. 358/405 |
| 7,095,739 | B2 | 8/2006 | Mamillapalli et al. ........ 370/390 |
| 7,246,156 | B2 | 7/2007 | Ginter et al. |
| 7,260,833 | B1 | 8/2007 | Schaeffer |
| 7,339,929 | B2 | 3/2008 | Zelig et al. .................... 370/390 |
| 7,356,581 | B2 | 4/2008 | Hashimoto .................... 709/224 |
| 7,370,025 | B1* | 5/2008 | Pandit ............................... 707/1 |
| 7,389,323 | B2 | 6/2008 | Tanimoto ...................... 709/206 |
| 7,403,946 | B1* | 7/2008 | Taylor ........................... 707/612 |
| 7,440,424 | B2 | 10/2008 | Nam et al. ..................... 370/310 |
| 7,454,366 | B2 | 11/2008 | Kato ............................... 705/21 |
| 7,512,116 | B2 | 3/2009 | Ohura ............................ 370/352 |
| 7,529,943 | B1 | 5/2009 | Beser ............................. 713/181 |
| 7,720,903 | B1* | 5/2010 | Huckins ......................... 709/200 |
| 2001/0027453 | A1 | 10/2001 | Suto |
| 2002/0003640 | A1 | 1/2002 | Trezza |
| 2002/0029281 | A1 | 3/2002 | Zeidner et al. |
| 2002/0118671 | A1 | 8/2002 | Staples et al. ................. 370/352 |
| 2003/0058810 | A1 | 3/2003 | Petronic |
| 2003/0119568 | A1 | 6/2003 | Menard |
| 2003/0195932 | A1* | 10/2003 | Tanabe et al. ................. 709/205 |
| 2003/0225798 | A1 | 12/2003 | Norcott |
| 2004/0058710 | A1* | 3/2004 | Timmins et al. .............. 455/560 |
| 2004/0103199 | A1* | 5/2004 | Chao et al. .................... 709/228 |
| 2004/0236874 | A1 | 11/2004 | Largman et al. |
| 2005/0033990 | A1* | 2/2005 | Harvey et al. ................. 713/201 |
| 2005/0055382 | A1 | 3/2005 | Ferrat et al. |
| 2005/0055385 | A1 | 3/2005 | Sinha et al. |
| 2005/0193024 | A1 | 9/2005 | Beyer et al. |
| 2005/0201373 | A1 | 9/2005 | Shimazu et al. .............. 370/389 |
| 2005/0216520 | A1 | 9/2005 | He et al. |
| 2005/0259587 | A1 | 11/2005 | Wakumoto et al. ........... 370/248 |
| 2006/0114566 | A1 | 6/2006 | Ohmori et al. ................ 359/566 |
| 2006/0153092 | A1 | 7/2006 | Matityahu et al. |
| 2006/0153110 | A1 | 7/2006 | Morgan et al. ................ 370/310 |
| 2006/0173850 | A1* | 8/2006 | Auer et al. ...................... 707/10 |
| 2006/0209719 | A1 | 9/2006 | Previdi et al. |
| 2007/0019683 | A1* | 1/2007 | Kryzyanowski ............... 370/503 |
| 2007/0223158 | A1 | 9/2007 | Ma et al. ......................... 361/56 |
| 2009/0024612 | A1* | 1/2009 | Tang et al. ......................... 707/5 |

OTHER PUBLICATIONS

"Interactive Link White Paper," Jul. 27, 2001, Tenix Defence Pty Ltd, Mawson Lakes, South Australia, Australia.

"Veto Uni-directional Network Bridge and Data Pump Applications White Paper", UNB and DPA White Paper by Tenix Datagate Pty Ltd, 2002, pp. 1-6.

Westmacott J., "Unidirectional Networking: GIAC Security Essential Certification Practical Assignment Version 1.46", SANS Institute, 2003.

Nilsen, Curt A., Information security implementations for Remote Monitoring; Symposium on Int'l Safeguards, Int'l Atomic Energy Agency, Vienna, Austria, Oct. 13-17, 1997.

Nilsen, Curt A. et al., The Secure Data Mirror; INMM; Nuclear Materials Managemenet; vol. XXVII (No. 2), 39th Annual Mtg. Proceedings, Naples, FL, Jul. 26-30, 1998, pp. 1322-1327.

Kang, M.H. et al: "Design and Assurance Strategy for the NRL Pump," Computer, IEEE Service Center, Los Alamitos, CA, US, vol. 31, No. 4, Apr. 1998, pp. 56-63.

Moore, Andrew P.: "Network Pump (NP) Security Target," Naval Research Laboratory Washington DC 20375-5320, [Online], May 29, 2000, pp. I-54, Retrieved from the Internet: URL:http://chacs.nrl.navy.mil/publications/CHACS/2000/2000moore-NPST.pdf> [retrieved on Jul. 30, 2012].

Kang M.H. et al: "A Network Pump," IEEE Transactions on Software Engineering, IEEE Service Center, Los Alamitos, CA, US, vol. 22, No. 5, May 1, 1996, pp. 329-338.

Kang M.H. et al: "An Architecture for multilevel secure interoperability," Computer Security Applications Conference, 1997. Proceedings., 13th Annual San Diego, CA, USA Dec. 8-12, 1997, Los Alamitos, CA USA, IEEE Comput. Soc, US, Dec. 8, 1997, pp. 194-204.

Davidson, J.A.: "Asymmetric Isolation," Computer Security Applications Conference, 1996., 12th Annual San Diego, CA, USA Dec. 9-13, 1996, Los Alamitos, CA, USA, IEEE Comput. Soc. US, Dec. 9, 1996, pp. 44-54.

\* cited by examiner

DATABASE UPDATE THROUGH A ONE-WAY DATA LINK

FIELD OF THE INVENTION

The present invention generally relates to unidirectional data transfer. More specifically, the present invention relates to mirroring databases communicable through a one-way data link and related database update techniques.

BACKGROUND OF THE INVENTION

Protection of a computer or data network against undesired and unauthorized data disclosure has been a perennial concern in the field of computer and network security. For example, firewall and anti-spyware software have been developed to address security concerns for computers and networks connected to the Internet and to protect them from possible cyberattacks such as Trojan horse-type viruses or worms that may trigger undesired and unauthorized data disclosure by these computers and networks. However, for high security computer networks such as those used by government agencies and intelligence communities and certain commercial applications, the conventional network security devices such as firewalls may not provide sufficiently reliable protection from undesired data disclosure.

Alternative network security methods and devices have been devised to address the network security concern. For example, U.S. Pat. No. 5,703,562 to Nilsen (the '562 patent"), the contents of which are hereby incorporated by reference in their entirety, provides an alternative way to address the network security concern. The '562 patent discloses a method of transferring data from an unsecured computer to a secured computer over a one-way optical data link comprising an optical transmitter on the sending side and an optical receiver on the receiving side. By providing such an inherently unidirectional data link to a computer/data link to be protected, one can eliminate any possibility of unintended data leakage out of the computer/data network over the same link.

As attacks on computers and networks generally require a bidirectional link over which the attacking computer can make unauthorized retrieval of data from a target computer or network, a one-way data link provides a structural defense by insulating the target computer or network against unintended leakage from "probing" attacks from the outside, while still allowing data transfer from the external source in a controlled fashion. FIG. 1 schematically illustrates an example of one such one-way data transfer system 100. In the one-way data transfer system shown in FIG. 1, two computing platforms (or nodes) 101 and 102 (respectively, "the Send Node" and "the Receive Node") are connected to the unsecured external network 104 ("the source network") and the secure network 105 ("the destination network"), respectively. The Send Node 101 is connected to the Receive Node 102 by a one-way data link 103, which may be an optical link comprising, for example, a high-bandwidth optical fiber. This one-way data link 103 may be configured to operate as a unidirectional data gateway from the source network 104 to the secure destination network 105 by having its ends connected to an optical transmitter on the Send Node and to an optical receiver on the Receive Node.

This configuration physically enforces one-way data transfer at both ends of the optical fiber connecting the Send Node 101 to the Receive Node 102, thereby creating a truly unidirectional one-way data link between the source network 104 and the destination network 105 shown in FIG. 1. Unlike the conventional firewalls, one-way data transfer systems based on a one-way data link are designed to transfer data or information only in one direction and it is physically impossible to transfer data or information of any kind in the reverse direction. No information or data of any kind, including handshaking protocols such as those used in data transport protocols such as TCP/IP, SCSI, USB, Serial/Parallel Ports, etc., can travel in the reverse direction from the Receive Node back to the Send Node across the one-way data link. Such physically imposed unidirectionality in data flow cannot be hacked by a programmer, as is often done with firewalls. Accordingly, the one-way data transfer system based on a one-way data link ensures that data residing on the isolated secure computer or network is maximally protected from any undesired and unauthorized disclosure.

While the use of a one-way data link affords significant improvements in network security, it also introduces novel problems in performing common network functions, such as updating of databases, that have been developed for bilateral communication channels. Updating, or replicating, networked databases is common network function involved in a number of applications including but not limited to, data archival, disaster recovery, and "mining" data for analysis without undue consumption of network resources. While the database update techniques for databases networked via bilateral links is a mature art which has been developed by many companies such as Oracle, such techniques cannot be directly applied to databases coupled via a unidirectional link, because implementation of the conventional database update techniques often requires a large amount of bilateral communications.

Because of many advantages in network security that are discussed above, it is often desirable and necessary to update databases through a one-way data link. Such system would be of great value to, for example, governmental agencies, intelligence communities, secure commercial applications and other users of highly secure networks that require constant updating of databases in their network.

One possible approach for updating databases through a one-way link would be a "brute force" method of replicating an entire database across the one-way link. However, such approach is inefficient in the use of available network resources and furthermore may be impractically slow depending on the size of the database to be copied.

It is an object of the present invention to provide an efficient approach for updating and replicating databases through a one-way data link.

It is yet another object of the present invention to provide a database update technique capable of effectuating incremental database updates in real time through a one-way data link.

It is yet another object of the present invention to provide a command-based database replication/update approach for databases connected by one-way data links.

It is yet another object of the present invention to utilize the functionalities of the conventional database update techniques based on bilateral communications in a data transfer system based on a one-way data link.

It is yet another object of the present invention to resolve sequencing conflicts and implement database update through a one-way data link in a sequential manner.

It is yet another object of the present invention to provide a mechanism for verifying the operability of a one-way data link in connection with database update function through the one-way data link.

It is yet another object of the present invention to provide a mechanism for detecting an error during the database update through a one-way data link and initiating necessary recovery procedures in case of detecting an error.

Other objects and advantages of the present invention will become apparent from the following description.

SUMMARY OF THE INVENTION

It has now been found that the above and related objects of the present invention are obtained in the form of a system and method for triggering database updates across a one-way link.

More particularly, the present invention relates to a database updating application for updating a remote database in accordance with a change in a reference database through a one-way data link, comprising a database trigger client associated with the reference database for generating a database update message in the form of a file or a data packet corresponding to the change in the reference database and sending the database update message to a send node interconnected to a receive node by the one-way data link, and a database trigger server associated with the remote database for receiving the database update message transmitted across the one-way data link and implementing the change in the remote database in accordance with the database update message.

The present invention is also directed to a database update system, comprising a send node, a receive node, a one-way data link interconnecting the send node and the receive node, a database trigger client for generating a database update message in the form of a file or a data packet corresponding to a change in a reference database and a database trigger server for implementing the change in a remote database in accordance with the database update message, wherein the database trigger client is communicatively coupled to the send node and the database trigger server is communicatively coupled to the receive node.

In addition, the present invention is also directed to a machine readable medium having instructions stored on a database trigger client, which is communicatively coupled to a send node, and on a database trigger server, which is communicatively coupled to a receive node, wherein the send node and the receive node are interconnected by a one-way data link, the instructions, when executed by the database trigger client, causing the database trigger client to create a database update message in the form of a file or a data packet corresponding to a change in a reference database, and transmit the database update message to the send node so that the send node can send the database update message to the receive node across the one-way data link, and the instructions, when executed by the database trigger server, causing the database trigger server to receive the database update message from the receive node, and implement the change in a remote database in accordance with the database update message.

These and other features of this invention are described in, or are apparent from, the following detailed description of various exemplary embodiments of this invention.

BRIEF DESCRIPTION OF THE DRAWINGS

The above and related objects, features and advantages of the present invention will be more fully understood by reference to the following, detailed description of the preferred, albeit, illustrative, embodiment of the present invention when taken in conjunction with the accompanying figures, wherein.

DETAILED DESCRIPTION OF THE PREFERRED EMBODIMENTS

Figure 2:
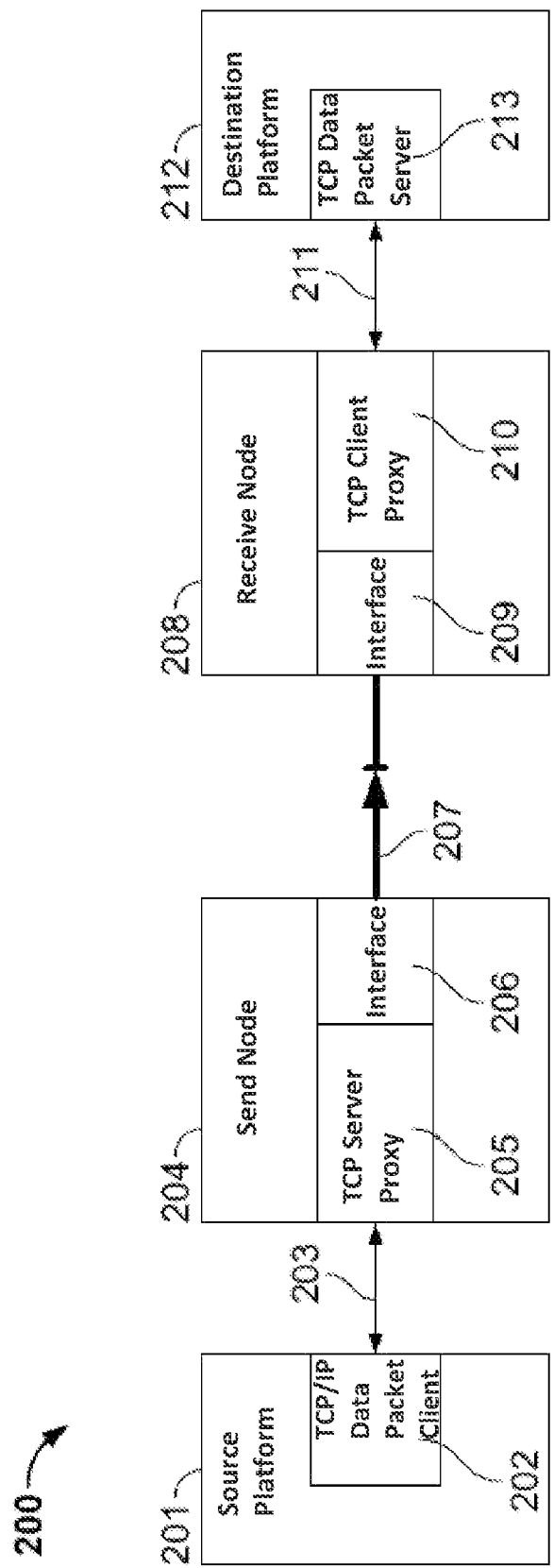
FIG. 2 is a functional block diagram that schematically illustrates TCP-based data packet transfer across a one-way data link.

Under suitable arrangements, data based on various conventional transport protocols may be transferred across a one-way data link despite the inherent unidirectionality of data transfer across the one-way data link. The following examples illustrate transfer of data packets or files based on the Transmission Control Protocol (TCP) across a one-way data link, but it is noted that implementation of the present invention is not limited to any particular data transport protocol. FIG. 2 is a functional block diagram that schematically illustrates implementation of a TCP-based secure data packet transfer across a single one-way data link in a one-way data transfer system 200. Construction of the conventional TCP sockets requires bilateral communications for it requires an acknowledgement channel from the receive node to the send node. Accordingly, the conventional TCP/IP protocol cannot be implemented directly in a one-way data transfer system based on a one-way data link, since no bilateral "hand shaking" is allowed over the one-way link due to physical enforcement of unidirectionality of data flow. Instead, the one-way data transfer system 200 illustrated in FIG. 2 uses a TCP simulation application called TCP proxy, which is preferably a TCP/IP socket-based proxy software, but may also be hardware-based or based on a suitable combination of software and hardware, to simulate the TCP/IP protocol across the one-way data link 207.

A TCP server proxy 205 fully implements the TCP/IP protocol in its bilateral communications 203 with the upstream TCP/IP data packet client 202 residing in a source platform 201. The TCP server proxy 205 may reside within the send node 204 as shown in FIG. 2, or alternatively, may be separate from but coupled to the send node 204.

When the TCP server proxy 205 receives the data packets from the TCP/IP data packet client 202, it removes the IP information normally carried in the data packets under the TCP/IP protocol and replaces it with pre-assigned channel numbers, so that no IP information is sent across the one-way data link 207. Instead, IP routes may be defined at the time of the configuration of the system 200 in the form of channel mapping tables residing in the TCP server proxy 205 associated with the send node 204 and the TCP client proxy 210 associated with the receive node 208. The send node 204 then sends the data packet with the pre-assigned channel numbers to the receive node 208 through its interface 206 across the one-way data link 207, which are received by the receive node 208 through its interface 209. A TCP client proxy 210, which may or may not reside in the receive node 208, then maps the channel numbers from the received data packet to the corresponding predetermined IP address of a destination platform 212. Like the TCP server proxy 205, the TCP client proxy 210 acts as a TCP/IP client, fully implementing the TCP/IP protocol in its bilateral communications 211 with the TCP data packet server 213 residing in the destination platform 212, requests a socket connection to the TCP server 213, and delivers the data packets received from the source platform 201 to the TCP data packet server 213 in the destination platform 212.

For the security of the overall one-way data transfer system 200, the IP address-to-channel number mapping table (e.g., Hostports.txt file) residing in the send node 204 may be different from the channel number-to-IP addressing mapping table (e.g., Portmap.txt file) residing in the receive node 208, and furthermore, neither table may be re-constructed on the basis of the other table. Neither table alone reveals the overall IP routing configuration from the source platform 201 to the destination platform 212. In this way, the IP information of the destination platform 212 may remain undisclosed to the sender at the source platform 201 and the security of the overall system 200 can be maintained.

Under the conventional TCP/IP protocol, the acknowledgement mechanism requiring bilateral communications provides may provide means for error detection. However, the one-way data link 207 forecloses such means. Instead, the one-way data transfer system 200 may assure data integrity by applying, for example, a hash algorithm such as MD5 to each data packet being transferred over the one-way data link 207. The send node 204 calculates an MD5 hash number associated with the content of each data packet to be sent to the receive node 208 over the one-way data link 207. When the receive node 208 receives the data packet, it may re-calculate a MD5 hash number associated with the received data packet and compare the result with the MD5 hash number calculated by the send node 204. By comparing these results, the receive node 208 may be able to determine as to whether any error has occurred during the transfer of the data packets across the one-way data link.

Figure 3:
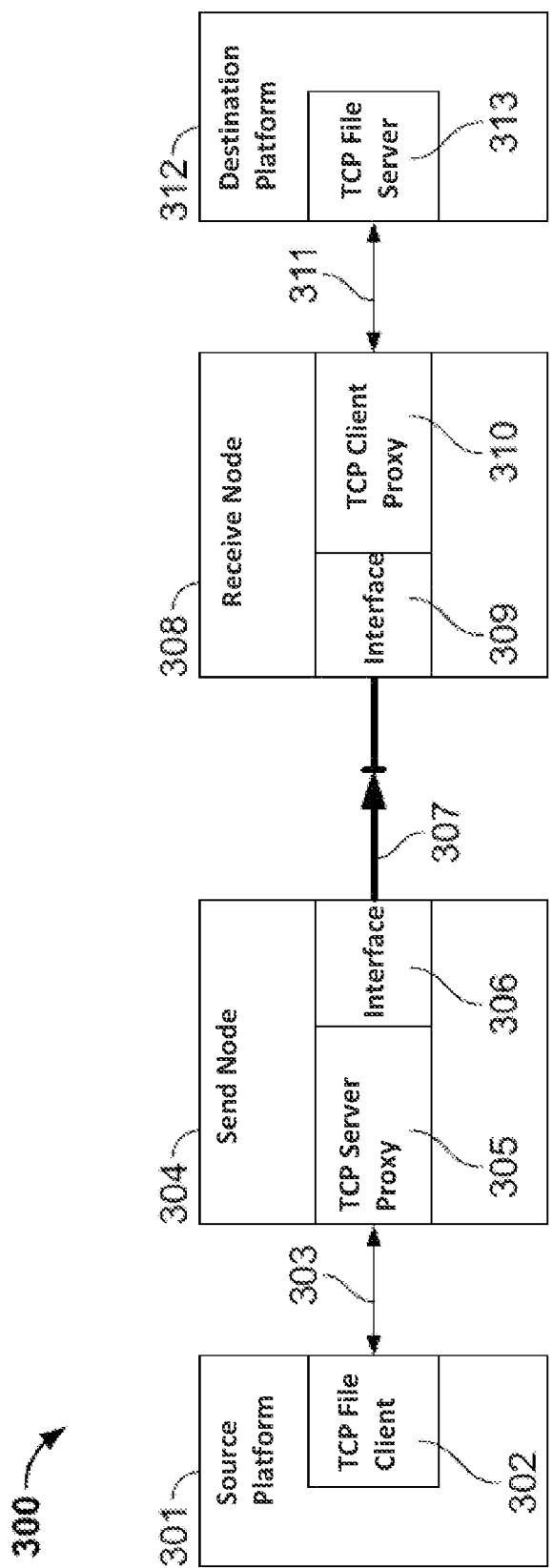
FIG. 3 is a functional block diagram that schematically illustrates TCP-based file transfer across a one-way data link.

A similar configuration may be used to transfer files across a one-way data link under the TCP/IP protocol. FIG. 3 is a functional block diagram that schematically illustrates implementation of a TCP-based file transfer across a single one-way link 307 in a one-way data transfer system 300. Like the one-way data transfer system 200 for transferring data packets across a one-way link in FIG. 2, a TCP server proxy 305 fully implements the TCP/IP protocol in its bilateral communications 303 with the upstream TCP file client 302 residing in a source platform 301. The TCP server proxy 305 may reside within the send node 304 as shown in FIG. 3, or alternatively, may be separate from but coupled to the send node 304. After the TCP server proxy 305 receives files from the TCP file client 302, the send node 304 sends the files through its interface 306 to the one-way data link 307. After the receive node 308 receives the files through its interface 309 from the one-way data link 307, the TCP client proxy 310, which may or may not reside in the receive node 308, communicates under the full implementation of the TCP/IP protocol with a TCP file server 313 residing in a destination platform 312 and forwards the received files to the TCP file server 313.

Like the TCP-based data packet transfer system 200 in FIG. 2, the TCP-based file transfer system 300 may be configured to prohibit transmission of IP information across the one-way data link 307 and may instead require that predetermined IP routes be established at the time of the configuration of the system 300. The TCP server proxy 305 removes the associated IP information from the received files and replaces it with pre-assigned channel numbers. The send node 304 then sends the files with the pre-assigned channel numbers to the receive node 308 across the one-way data link 307. Upon receipt of the files, the TCP client proxy 310 then maps the channel numbers from the received files to the corresponding predetermined IP address of a destination platform 312, to which the files are forwarded.

Figure 1:
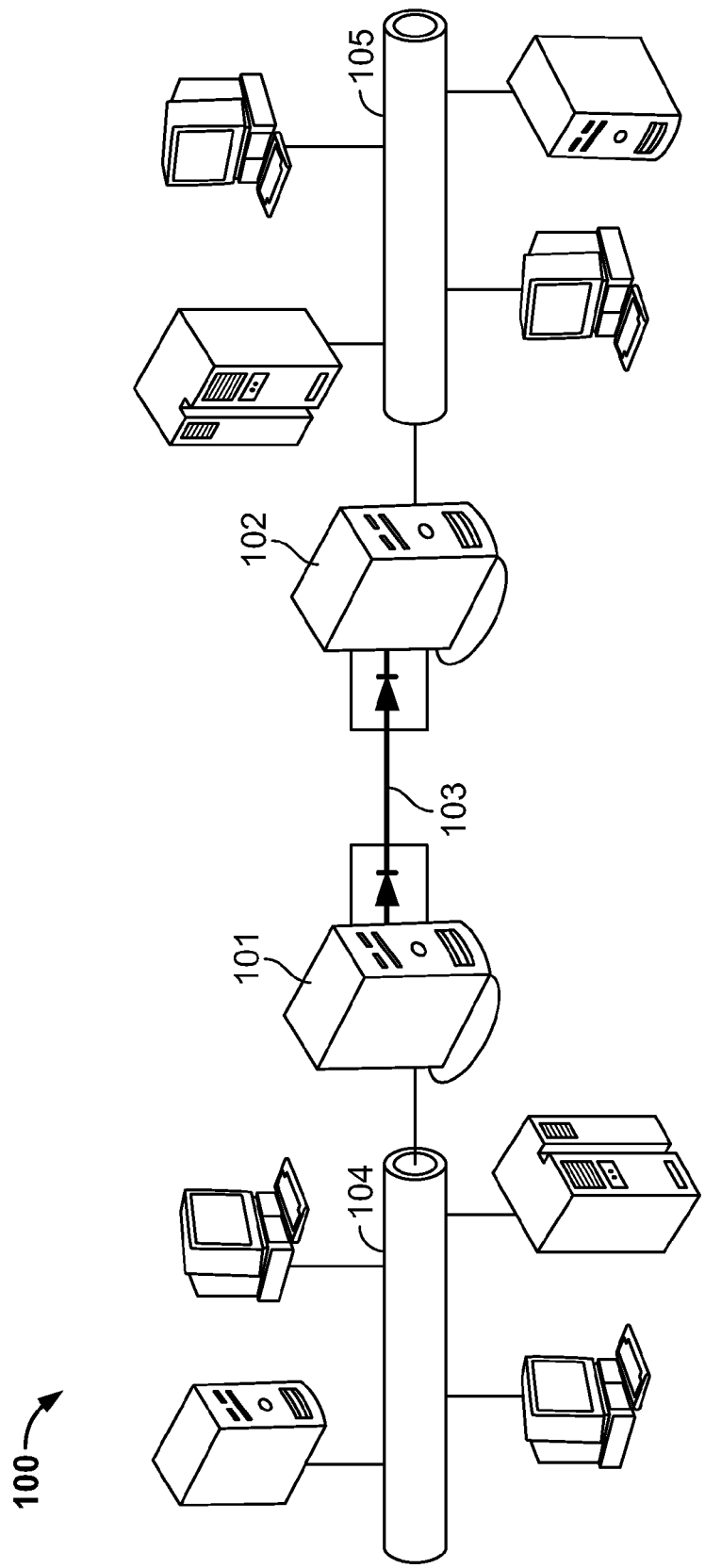
FIG. 1 schematically illustrates an example of a secure one-way data transfer system based on a one-way data link.
Figure 4:
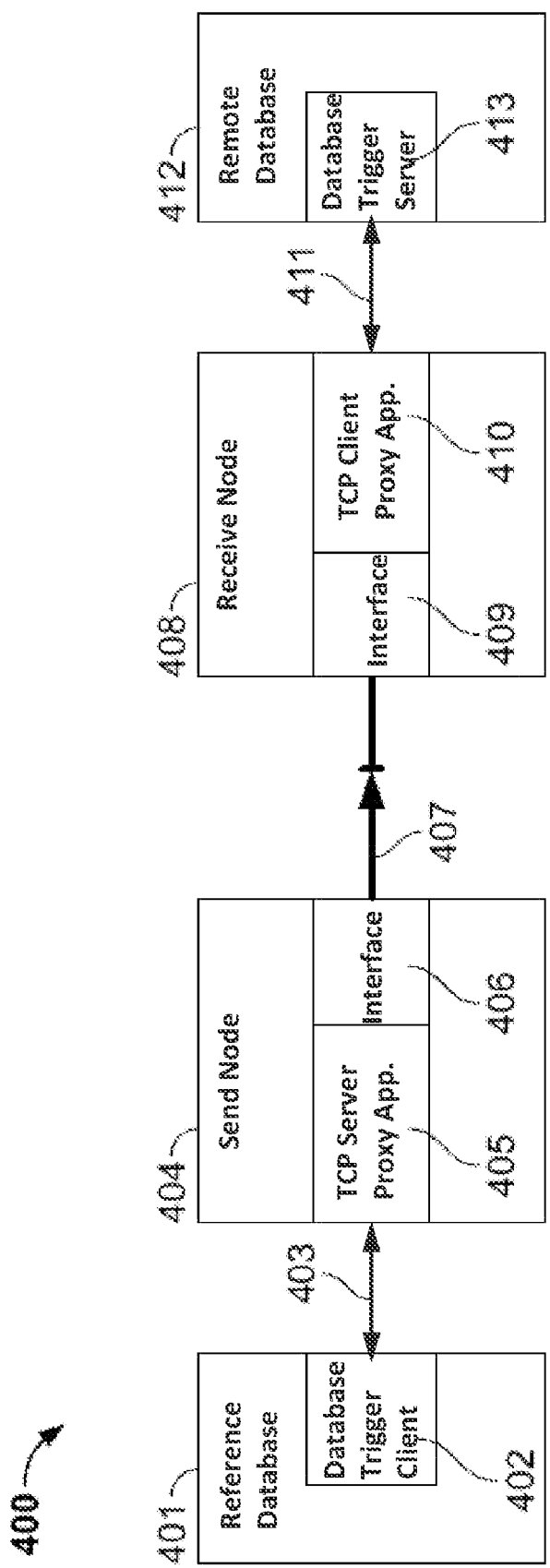
FIG. 4 is a functional block diagram that schematically illustrates one possible embodiment of the present invention.

FIG. 4 is a functional block diagram schematically illustrating one exemplary embodiment of the present invention. The system 400 illustrated in FIG. 4 comprises a reference database 401 and a remote database 412 that are interconnected by a one-way data transfer system based on a one-way data link 407 such as those described above for TCP-based data packet/file transfer illustrated in FIGS. 2 and 3 comprising (204, 207, 208), (304, 307, 308), respectively. There is no bilateral communication channel between the reference database 401 and the remote database 412. It is noted that the present invention may be implemented with a reference database and a remote database interconnected by a one-way data transfer system for other type of data transport protocol. In addition, in an alternative embodiment, there may be a plurality of reference databases and the corresponding number of remote databases that are interconnected by a one-way data transfer system. Additionally, each of the reference database 401 and the remote database 412 may be part of a larger network (i.e., a source network for the reference database and a destination network for the remote database), and the reference database 401 and the remote database 412 may be respectively coupled to the send node 404 and the receive node 408 indirectly through their respective network, as schematically illustrated in FIG. 1.

In FIG. 4, the reference database 401 may comprise one or more individual tables or databases. The reference database 401 (as well as the remote database 412) support basic database commands such as insert, delete and update so that data can be stored, added, deleted and updated in the database. Furthermore, any changes in the reference database 401 may be detected and read by a hardware or software application. The reference database 401 may be coupled to a send node 404 via a communication channel 403, which may be a bilateral channel capable of implementing TCP communication. As shown in the figure, the reference database 401 and the send node 404 may be on separate platforms in a network system, or alternatively, they may be configured within the same computing platform.

As explained above in the context of FIGS. 2 and 3, the send node 404 may comprise a TCP server proxy application 405 and an interface 406 to the one-way data link 407. The one-way data link 407 is for unidirectional transfer from the send node 404 to a receive node 408. Alternatively, the TCP server proxy may reside in a separate network device communicatively coupled to the send node 404. The TCP server proxy 405 is communicatively coupled to a database trigger client 402 via the communication channel 403.

The database trigger client 402 may be a software-based or hardware-based application that is capable of detecting a change made in the reference database 401 and further creating database update messages in the form of a file or a data packet in response to the change in the reference database. The database update message may correspond to a change or multiple changes in the reference database. For example, the database trigger client 402 may use or comprise a database management software based on Standard Query Language (SQL) commands for generating the files. Alternatively, the database trigger client 402 may use or generate Perl commands, Java commands, basic database commands, or any other suitable commands that can be interpreted and applied by a receiving side. As shown in FIG. 4, the database trigger client 402 may reside within the reference database 401, or alternatively reside in a separate network device communicatively coupled to the reference database.

On the other side of the one-way data link 407, the receive node 408 may comprise a TCP client proxy application 410 and an interface 409 to the one-way data link 407 through which the receive node 408 receives data from the send node 404. Similar to the TCP server proxy, the TCP client proxy may alternatively reside in a separate network device communicatively coupled to the receive node 408. The TCP client proxy 410 may be coupled to a database trigger server 413 via a bilateral TCP communication channel 411.

The database trigger server 413 may be a software-based or hardware-based application that is capable of receiving the database update messages transmitted through the one-way data link 407 and further updating the remote database 412 based on these received database update messages. The database trigger server 413 may further be capable of monitoring the sequence information of the received database update messages. The database trigger server 413 may also be capable of, for example, opening the received database update messages by a Java script application and execute SQL commands embedded in the received database update messages to effectuate the corresponding updates in the remote database 412.

As shown in FIG. 4, the database trigger server 413 may reside within the remote database 412, or alternatively reside in a separate network device communicatively coupled to the remote database. The remote database 412 may comprise one or more databases in which data can be stored, added, deleted and updated in accordance with a set of commands by a hardware- or software-based application. As shown in the figure, the remote database 412 and the receive node 408 may be on separate platforms in a network system, or alternatively, they may be configured within the same platform.

In FIG. 4, the occurrence of any changes to the content of the reference database 401 triggers the system 400 to communicate the changes to the remote database 412 across a one-way data link 407 so that the remote database 412 on the other side of the one-way data link 407 can be updated to mirror the reference database 401 in real time. The database update through a one-way data link may be done in the following way, but persons of ordinary skill will recognize that this is merely illustrative and not limitative of the present invention, and that steps and the sequence of those steps as well as components and applications used by those steps may vary from those described below in order to implement other possible embodiments of the present invention.

When changes to the entries in the reference database 401 occur, the changes trigger the database trigger client 402 associated with the reference database 401. Upon detecting the changes, the database trigger client 402 generates a database update message in the form of a file or a data packet corresponding to the changes in the reference database 401. For example, the database update message may comprise a set of commands describing the changes, which are to be ultimately executed in the remote database 412 to replicate the changes therein. The database commands (either primary or secondary) may be in the form of standard SQL commands, Perl commands, Java commands, basic database commands, or may comprise any other suitable proprietary language structure pertaining to that database that can be interpreted and applied by the receiving side of the one-way data link 407, such as the remote database 412. The database trigger client 402 may write these commands in a file.

In one exemplary embodiment of the present invention, changes made to an individual table in the reference database 401 trigger execution of a preconfigured set of commands to capture the data change in the reference database 401 (e.g., by reading the row data corresponding to the changed entry in a table of the reference database). Based on these commands, the database trigger client 402, generates a secondary set of commands, such as SQL commands, for replicating the changes on the remote database 412. The database trigger client 402 may then write the captured changed data entry (e.g., the corresponding row data) and the secondary commands to a database update message in the form of a uniquely named file to be transferred across the one-way data link 407.

When replicating the changes in the reference database 401 on the remote database 412, it is important to maintain the correct sequential order of the changes. To do so, the sequence information may be included in the database update messages corresponding to the changes. Preferably, the database trigger client 402 is capable of generating database update messages that reflect the correct sequential order of the changes. As one example, the database update messages in the form of, for example, files created by the database trigger client 402 in response to the changes in the reference database 401 may be assigned corresponding unique and sequentially sortable filenames. Unique filenames may also prevent any accidental overwriting of files during multiple file transfers. For example, in some embodiments of the present invention, a filename may include a "counter" or a sequence number which can be incremented upwards with each successive update and file writing operation (e.g., operation001, operation002, operation003, etc.), thereby ensuring uniqueness and sequential sortability in the filename. Alternatively, a filename may achieve uniqueness and sortability by including timestamp information. In this way, the database update messages may be sequentially ordered by their corresponding filenames. The sequential sorting of the database update messages may be done prior to their transmission across the one-way data link 407, or alternatively upon their receipt by the database trigger server 413.

In some embodiments, the database update messages created and sequentially ordered by the database trigger client 402 may be copied and cached by the database trigger client 402 or other application residing on the send side of the one-way data link 407. The cached database update messages may be used for a number of diagnostic functions, including constructing the changes on a secondary database on the send side of the one-way data link 407 to check the accuracy of the update commands in the database update messages. Alternately, the cached database update messages may be re-transmitted over the one-way data link 407 to the receive side of the one-way data link as part of a recovery procedure in case of a communication failure during the first attempt at database update.

In some cases, it may be advantageous to "lock" the reference database 401 to prevent other users from accessing the reference database during the database updating process. By "locking" the database, the potential sequencing conflicts arising from simultaneous changes on the database by multiple users or processes may be prevented. The database may be "unlocked" after the assignment of the sequence information to the database update message corresponding to the change, or alternatively after the transmission of the database update messages to the receive node 408 through the one-way data link 407. This allows the changes made by multiple simultaneous users of the reference database 401 to be replicated to the remote database 412 in proper sequence.

The database trigger client 402 may utilize the functionality of the conventional database update applications to generate the database update messages corresponding to the changes in the reference database 401. As noted above, the conventional database update applications typically require bilateral communications to effectuate updates in a target database. While such conventional applications may not be able to operate directly through the one-way data link 407, they can be implemented through the interposition of, for example, the TCP server proxy 405 and the TCP client proxy 410, which are capable of simulating fully bilateral TCP communications via bilateral communication channels 403, 411 with the database trigger client 402 and the database trigger server 413, respectively. Preferably, the TCP server proxy 405 and TCP client proxy 410 are configured to optimally utilize the functionalities of the conventional database update application used by the database trigger client 402 and the database trigger server 413.

The database update messages corresponding to the changes in the reference database 401 that are created by the database trigger client 402 are then sent to the send node 404, which then transfers the database update messages to the one-way data link 407 through the interface 406. These database update messages are then received by the receive node 408 through its interface 409 to the one-way data link 407, and communicated to the database trigger server 413 associated with the remote database 412.

The database trigger server 413 may be configured to monitor and validate the sequence information contained in the database update messages received from the database trigger client 402. Once the sequential sorting of the database update messages based on the sequence information is complete (either by the database trigger client 402 or by the database trigger server 413 or by both), the database trigger server 413 opens the received database update messages and execute/read the database update commands/information contained therein in accordance with the sequential order. For example, in some embodiments of the present invention, the database trigger server 413 opens the database update message generated by the database trigger client 402 by using a preconfigured Java script application and executes the SQL commands embedded in the database update message to replicate the corresponding changes (e.g., the row data corresponding to the changes) on the remote database 412. The database trigger server 413 executes the changes to be implemented in the remote database 412, preferably in the same sequence as those initially made at the reference database 401. In this way, the system 400 in FIG. 4 may update in real time the remote database 412 to reflect any changes made in the reference database 401 through the one-way data link 407.

Additionally, some embodiments of the present invention may further incorporate means for verifying the integrity and real-time operability a one-way data link in conjunction with the database update function. Because of the unidirectionality of data flow enforced in the one-way data link, the conventional verification techniques such as "handshakes" and feedback messages requiring bilateral communications may not be applied. Instead, a verification mechanism based on the unidirectionality of data flow through a one-way data link is needed.

One such verification mechanism may be provided, for example, in the context of FIG. 4, by transmission of "heartbeat" messages. The heartbeat messages may be transmitted from the send side to the receive side through a one-way data link at predetermined intervals, whether or not there are any database updates, to verify the integrity and operability of the one-way data link. In some embodiments of the present invention, the heartbeat messages are generated by the database trigger client 402 associated with the reference database 401 to be ultimately received by the database trigger server 413 associated with the remote database 412. However, it is noted that the present invention does not necessarily restrict the generator and the receiver of the heartbeat messages to the database trigger client 402 and server 413. Under the present invention, they may be a pair of any other components or devices on the send and the receive sides, respectively, in the system, such as the TCP server proxy 405 and the TCP client proxy 410.

The heartbeat message may take any suitable form that can be interpreted by a receiver of the message. For example, the heartbeat messages may comprise a predetermined content known by the remote database 412. By monitoring the arrival of the heartbeat messages from the send side of the one-way data link such as the reference database 401 and comparing them to the expected arrival time and/or the predetermined content, the remote database 412 may be able to verify the integrity and operability of one-way data link 407 for the purpose of database update function. In some embodiments of the present invention, the heartbeat messages may also include the database update messages created by the database trigger client 402 in response to changes in the reference database 401.

In one illustrative example of using the heartbeat messages, a hardware or software-based application on the send side such as the database trigger client 402 or the TCP server proxy 405, issues heartbeat messages at predetermined intervals. As noted above, the corresponding heartbeat message may comprise a predetermined content known to or understood by the remote database 412. In some embodiments of the present invention, each heartbeat message may be implemented in database scripts to provide the corresponding timestamp data which can be tracked by the receive side. In other alternative embodiments of the present invention, if there have been changes in the reference database 401 since the last time a heartbeat message was issued, the next heartbeat message may include database update messages created by the database trigger client 402 in response to those changes.

The heartbeat messages are then transmitted by the send node 404 to the receive node 408 through the one-way data link 407 and ultimately to a hardware- or software-based application on the receive side, such as the database trigger server 413 or the TCP client proxy 410. The application monitors the arrival of the heartbeat messages. If the expected heartbeat message arrives at the expected time, the remote database 412 may, for example, reset its internal timer for the next expected heartbeat message and discard the received heartbeat message. On the other hand, if no heartbeat message is received at the predetermined interval, or if heartbeat messages arrive at irregular intervals or out of sequence, or if the received heartbeat message does not match the predetermined content, such unexpected event may trigger a need to communicate that event to, for example, an administrator of the remote database 412. For example, the application may flag a warning indicator or generate an error message that the integrity and operability of the one-way data link 407 or other components involved in the database update process might have been compromised, and then may further initiate an appropriate recovery procedure. For example, a communication failure detected by the lost or improper heartbeat may be recovered by re-transmitting any SQL commands issued by the database trigger client 402 since the last verifiable heartbeat message was received by the remote database 412, based on its timestamp information. In some embodiments of the present invention, upon detecting failure of receiving the expected heartbeat message from the database trigger client 402, the database trigger server 413 may insert a special log message into a database table on the remote database 412 that may be monitored by an administrator In another alternative embodiments where a TCP client proxy 410 is the designated receiver of heartbeat messages generated by the TCP server proxy 405, upon detecting failure of receiving the expected heartbeat message, the TCP client proxy 410 may generate special SNMP trap messages, or other suitable types of reporting messages created by a user-defined script file, to get the attention of an administrator of the remote database 412.

When the heartbeat message received by the application on the receive side includes database update messages corresponding to the changes made in the reference database 401, the application first verifies the integrity and operability of the one-way data link 407 and other components involved in the database update process by, for example, checking the sequencing or timestamp information contained in the received heartbeat message. Upon verification, the application may forward the database update messages to the database trigger server 413 to implement the changes in the remote database 412 in accordance with the database update messages. As noted above, in some embodiments of the present invention, the application may reside within or be part of the database trigger server 413 so that the replication of the changes to the remote database 412 immediately follows the verification process.

While this invention has been described in conjunction with exemplary embodiments outlined above and illustrated in the drawings, it is evident that many alternatives, modifications and variations will be apparent to those skilled in the art. Accordingly, the exemplary embodiments of the invention, as set forth above, are intended to be illustrative, not limiting, and the spirit and scope of the present invention is to be construed broadly and limited only by the appended claims, and not by the foregoing specification.

What is claimed is:

1. A database update system, comprising:
   a send node;
   a receive node;
   a one-way data link for unidirectional transfer from the send node to the receive node;
   a reference database; and
   a remote database,
   wherein:
   there is no communication route for bilateral communication between the reference database and the remote database;
   the reference database comprises a processor for executing a database trigger client application for detecting a change made in the reference database and generating a database update message in the form of a file or a data packet corresponding to the change in the reference database, the database update message including sequence and verification information and being compatible with unidirectional dataflow;
   wherein the database trigger client application is configured to lock the reference database when the database update message is being generated and unlock the reference database after the sequence information is assigned to the database update message;
   the send node comprises a processor for executing a server proxy application for receiving the database update message from the reference database, removing IP information from the database update message, replacing the Internet Protocol (IP) information with a pre-assigned channel number, and relaying the database update message with the channel number from the reference database to the one-way data link;
   the remote database comprises a processor for executing a database trigger server application for receiving the database update message and replicating the change in the remote database in accordance with the database update message transmitted through the one-way data link; and the receive node comprises a processor for executing a client proxy application for receiving the database update message with the channel number from the one-way data link, mapping the channel number of the received database update message to IP information of the remote database and relaying the database update message from the one-way data link to the remote database,
   so that no bilateral communication between the reference database and the remote database is necessary for updating the remote database based on the change in the reference database.

2. The database updating system of claim 1, wherein the database update message comprises commands for replicating the change.

3. The database updating system of claim 2, wherein the commands are Structured Query Language (SQL) commands, Perl commands, Java commands, or basic database commands.

4. The database updating system of claim 1, wherein the database update message comprises a data entry corresponding to the change.

5. The database updating system of claim 1, wherein the database update message corresponds to multiple changes in the reference database.

6. The database updating system of claim 1, wherein the processor for executing the database trigger server application comprises a monitor for validating the sequence information in the database update message.

7. The database updating system of claim 1, wherein the processor for executing the database trigger server application comprises a sorter for sequentially sorting the database update message in accordance with the sequence information.

8. The database updating system of claim 1, wherein the processor for executing the database trigger client application comprises a sorter for sequentially sorting the database update message in accordance with the sequence information.

9. The database updating system of claim 1, wherein the sequence information comprises a sequence number.

10. The database updating system of claim 1, wherein the sequence information comprises a timestamp data.

11. The database updating system of claim 1, wherein the sequence information comprises a sequentially sortable filename.

12. The database updating system of claim 1, wherein the verification information comprises heartbeat messages at predetermined intervals.

13. The database updating system of claim 12, wherein the processor for executing the database trigger server application comprises a monitor for monitoring the heartbeat messages.

14. The database updating system of claim 13, wherein the processor for executing the database trigger server application further comprises a generator of an error indicator based on the monitored heartbeat messages.

15. The database updating system of claim 12, wherein the heartbeat messages comprise a predetermined content known to the database trigger server application.

16. The database updating system of claim 2, wherein the processor for executing the database trigger server application is configured to execute the commands in the database update message for replicating the change on the remote database.

17. The database updating system of claim 16, wherein the commands are SQL commands, Perl commands, Java commands, or basic database commands.

18. The database updating system of claim 16, wherein the processor for executing the database trigger server application comprises a Java script application to open the database update message.

19. The database updating system of claim 1, wherein the server proxy application comprises a Transmission Control Protocol (TCP) server proxy application capable of having bidirectional communications with the database trigger client application.

20. The database updating system of claim 1, wherein the client proxy application comprises a TCP client proxy application capable of having bidirectional communications with the database trigger server application.

21. A non-transitory machine readable medium having instructions stored on a database update system comprising:
a reference database having a processor for executing a database trigger client application,
a remote database having a processor for executing a database trigger server application,
a one-way data link for unidirectional transfer from a send node to a receive node, the send node having a processor for executing a server proxy application, and the receive node having a processor for executing a client proxy application, the instructions, when executed by the system,
causing the database trigger client application to detect a change in the reference database and create a database update message in the form of a file or a data packet corresponding to the change in the reference database, the database update message including sequence and verification information and being compatible with unidirectional dataflow,
cause the database trigger client application to further lock the reference database when generating the database update message, and unlock the reference database after the sequence information is assigned to the database update message,
causing the server proxy application to receive the database update message from the reference database, removing Internet Protocol (IP) information from the database update message, replacing the IP information with a pre-assigned channel number, and relay the database update message with the channel number from the database trigger client application to the one-way data link,
causing the client proxy application to receive the database update message with the channel number from the one-way data link, mapping the channel number of the received database update message to IP information of the remote database, and relay the database update message from the one-way data link to the database trigger server application, and
causing the database trigger server application to replicate the change in the remote database in accordance with the database update message, wherein no bilateral communication between the reference database and the remote database is used for updating the remote database based on the change in the reference database.

22. The non-transitory machine readable medium of claim 21, wherein the database update message comprises commands for replicating the change.

23. The non-transitory machine readable medium of claim 22, wherein the commands are Structured Query Language (SQL) commands, Perl commands, Java commands, or basic database commands.

24. The non-transitory machine readable medium of claim 21, wherein the database update message comprises a data entry corresponding to the change.

25. The non-transitory machine readable medium of claim 21, wherein the database update message corresponds to multiple changes in the reference database.

26. The non-transitory machine readable medium of claim 21, wherein the instructions, when executed by the system, cause the database trigger server application to further validate the sequence information prior to replicating the change in the remote database.

27. The non-transitory machine readable medium of claim 21, wherein the instructions, when executed by the system, cause the database trigger server application to further sort the database update message sequentially in accordance with the sequence information.

28. The non-transitory machine readable medium of claim 21, wherein the instructions, when executed by the system, cause the database trigger client application to further sort the database update message sequentially in accordance with the sequence information.

29. The non-transitory machine readable medium of claim 21, wherein the sequence information comprises a sequence number.

30. The non-transitory machine readable medium of claim 21, wherein the sequence information comprises a timestamp data.

31. The non-transitory machine readable medium of claim 21, wherein the sequence information comprises a sequentially sortable filename.

32. The non-transitory machine readable medium of claim 12, wherein the verification information comprises heartbeat messages at predetermined intervals.

33. The non-transitory machine readable medium of claim 32, wherein the instructions, when executed by the system, cause the database trigger server application to further monitor the heartbeat messages.

34. The non-transitory machine readable medium of claim 33, wherein the instructions, when executed by the system, cause the database trigger server application to further generate an error message based on the result of monitoring the heartbeat messages.

35. The non-transitory machine readable medium of claim 32, wherein the heartbeat messages comprise a predetermined content known to the database trigger server.

36. The non-transitory machine readable medium of claim 22, wherein the step to replicate the change in a remote database in accordance with the database update message by the database trigger server application comprises the step to execute the commands in the database update message.

37. The non-transitory machine readable medium of claim 23, wherein the step to replicate the change in a remote database in accordance with the database update message by the database trigger server application comprises the step to execute the SQL commands.

38. The non-transitory machine readable medium of claim 21, wherein the step to replicate the change in a remote database in accordance with the database update message by the database trigger server application comprises the step to open the database update message by a Java script application.

39. The non-transitory machine readable medium of claim 21, wherein the processor for executing the database trigger client application resides in the reference database.

40. The non-transitory machine readable medium of claim 21, wherein the processor for executing the database trigger server application resides in the remote database.

41. The non-transitory machine readable medium of claim 21, wherein the server proxy application comprises a Transmission Control Protocol (TCP) server proxy application capable of having bidirectional communications with the database trigger client application.

42. The non-transitory machine readable medium of claim 21, wherein the client proxy application comprises a TCP client proxy application capable of having bidirectional communications with the database trigger server application.

43. The non-transitory machine readable medium of claim 21, wherein the step to create a database update message corresponding to the change in the reference database by the database trigger client application comprises the steps to:

read a data entry corresponding to the change from the reference database;

generate SQL commands for replicating the data entry; and write the data entry and the SQL commands to the database update message having a unique filename, and the step to replicate the change in the remote database in accordance with the database update message by the database trigger server application comprises the steps to:

execute a Java script application to open the database update message; and execute the SQL commands in the database update message to replicate the data entry on the remote database.

\* \* \* \* \*

UNITED STATES PATENT AND TRADEMARK OFFICE
CERTIFICATE OF CORRECTION

| | | |
|---|---|---|
| PATENT NO. | : 8,352,450 B1 | Page 1 of 1 |
| APPLICATION NO. | : 11/788077 | |
| DATED | : January 8, 2013 | |
| INVENTOR(S) | : Ronald Mraz, James Hope and Andrew Holmes | |

It is certified that error appears in the above-identified patent and that said Letters Patent is hereby corrected as shown below:

In Claim 3 in Column 12, Line 17, change "Structured Query Language" to -- Standard Query Language --.

In Claim 23 in Column 13, Line 65, change "Structured Query Language" to -- Standard Query Language --.

Signed and Sealed this
Nineteenth Day of February, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,352,450 B1 | Page 1 of 1 |
| APPLICATION NO. | : 11/788077 | |
| DATED | : January 8, 2013 | |
| INVENTOR(S) | : Mzraz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 352 days.

Signed and Sealed this
Eleventh Day of November, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,352,450 B1 | Page 1 of 1 |
| APPLICATION NO. | : 11/788077 | |
| DATED | : January 8, 2013 | |
| INVENTOR(S) | : Mraz et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 352 days.

This certificate supersedes the Certificate of Correction issued November 11, 2014.

Signed and Sealed this
Sixteenth Day of December, 2014

Michelle K. Lee
*Deputy Director of the United States Patent and Trademark Office*